United States Patent
Wilson

(10) Patent No.: US 9,610,991 B2
(45) Date of Patent: Apr. 4, 2017

(54) METHOD FOR INSTALLING A LINER PLATE AND THE LINER PLATE

(75) Inventor: Ian James Wilson, Bali (ID)

(73) Assignee: MAKURI TECHNOLOGY PTE LTD., Singapore (SG)

( * ) Notice: Subject to any disclaimer, the term of this patent is extended or adjusted under 35 U.S.C. 154(b) by 83 days.

(21) Appl. No.: 14/391,894

(22) PCT Filed: Apr. 12, 2012

(86) PCT No.: PCT/SG2012/000126
§ 371 (c)(1),
(2), (4) Date: Oct. 10, 2014

(87) PCT Pub. No.: WO2013/154498
PCT Pub. Date: Oct. 17, 2013

(65) Prior Publication Data
US 2015/0274229 A1    Oct. 1, 2015

(51) Int. Cl.
*B62D 65/02* (2006.01)
*E02F 9/28* (2006.01)
*B60R 13/01* (2006.01)

(52) U.S. Cl.
CPC ............ *B62D 65/02* (2013.01); *E02F 9/2883* (2013.01); *B60R 13/01* (2013.01); *Y10T 29/49826* (2015.01)

(58) Field of Classification Search
CPC ............ B62D 25/2054; B62D 25/2063; B62D 25/2072; B62D 33/02; B62D 33/0207; B62D 65/02; B60R 13/01; B60R 2013/018; B60P 1/28; B60P 1/286; E02F 9/2883; Y10T 29/49826

USPC ................ 296/39.1, 39.2, 182.1–184.1, 191; 29/897.1, 402.09, 402.14, 402.16, 530
See application file for complete search history.

(56) References Cited

U.S. PATENT DOCUMENTS

| | | | | |
|---|---|---|---|---|
| 2,504,509 A | * | 4/1950 | Erickson | B23P 6/04 228/119 |
| 3,084,973 A | * | 4/1963 | Beckley | B60P 3/32 264/257 |
| 4,644,631 A | * | 2/1987 | Shock | B60P 1/286 29/402.01 |
| 4,752,098 A | * | 6/1988 | Shock | B60P 1/28 296/184.1 |
| 4,916,880 A | * | 4/1990 | Westerman, Jr. | B29C 73/04 156/94 |

(Continued)

FOREIGN PATENT DOCUMENTS

| | | |
|---|---|---|
| JP | 54096642 | 7/1979 |
| JP | 09158692 | 6/1997 |

OTHER PUBLICATIONS

International Preliminary Report on Patentability for Application No. PCT/SG2012/000126 dated Aug. 1, 2014.
(Continued)

*Primary Examiner* — Gregory Blankenship
(74) *Attorney, Agent, or Firm* — Bryant J. Keller; Kirton McConkie, PC

(57) ABSTRACT

There is provided a method for installing a liner plate mounted on an interface surface of a load-bearing portion of mobile earth-moving machinery. There is also provided a liner plate which includes at least two openings and at least one grout strip, with the at least one grout strip being along a perimeter of the liner plate.

20 Claims, 3 Drawing Sheets

(56) References Cited

U.S. PATENT DOCUMENTS

| | | | | |
|---|---|---|---|---|
| H1318 H | * | 6/1994 | Rozenboom et al. ........................ | B62D 25/2054 296/183.2 |
| 6,149,749 A | * | 11/2000 | McBroom ............... | B29C 73/02 156/87 |
| 6,889,417 B2 | * | 5/2005 | Jones ...................... | B65D 7/22 264/328.12 |
| 9,010,833 B2 | * | 4/2015 | Burstrom ................ | B60P 1/286 296/183.2 |
| 2004/0026959 A1 | * | 2/2004 | Kostecki ................ | B60P 1/286 296/183.2 |
| 2005/0093338 A1 | * | 5/2005 | Medel .................... | B60P 1/283 296/183.1 |
| 2006/0158001 A1 | * | 7/2006 | Emch ...................... | B29C 73/02 296/39.1 |
| 2010/0276969 A1 | * | 11/2010 | Auchter-Bruening ..... | B60J 7/04 296/191 |
| 2011/0285171 A1 | * | 11/2011 | Caliskan ................ | B32B 3/266 296/191 |
| 2014/0252801 A1 | * | 9/2014 | Hettinger ................. | B60P 1/28 296/183.2 |
| 2015/0035314 A1 | * | 2/2015 | Kibler ...................... | B60P 1/28 296/183.2 |
| 2015/0274229 A1 | * | 10/2015 | Wilson ................... | E02F 9/2883 296/191 |
| 2015/0375604 A1 | * | 12/2015 | Scott ........................ | B60J 5/04 49/501 |

OTHER PUBLICATIONS

International Search Report for Application No. PCT/SG2012/000126 dated Jul. 25, 2012.

* cited by examiner

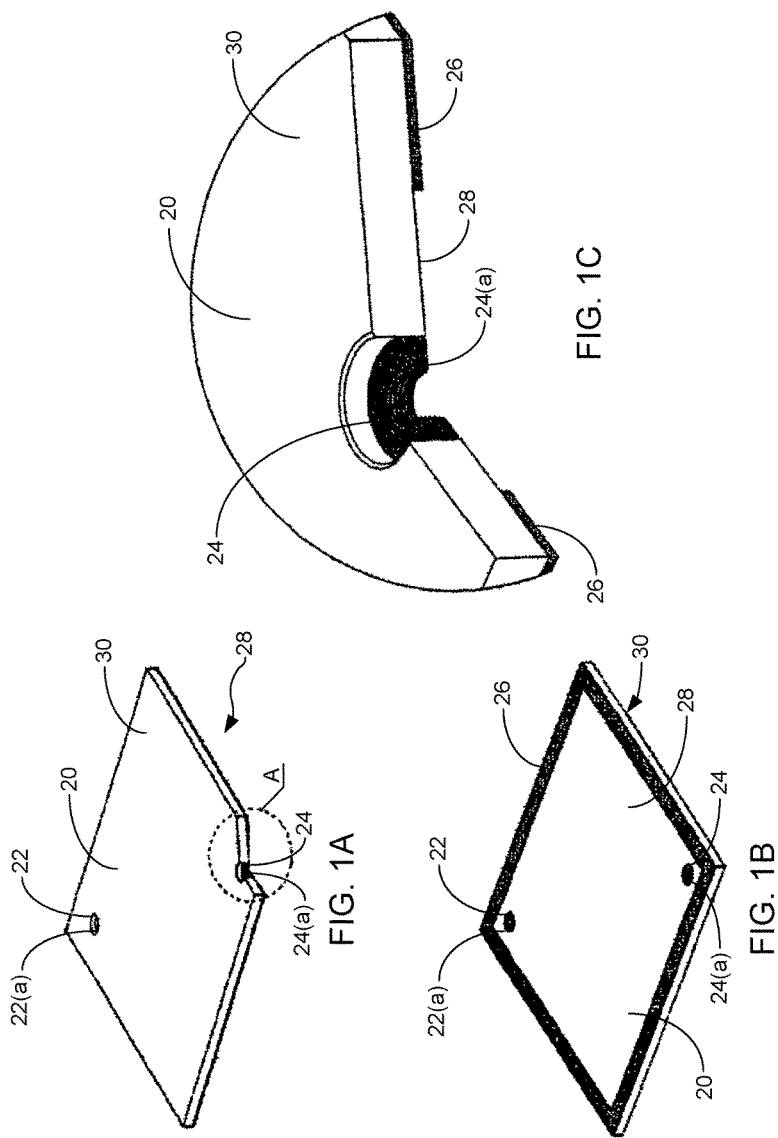

METHOD FOR INSTALLING A LINER PLATE AND THE LINER PLATE

CROSS REFERENCE TO RELATED APPLICATION

The present application is a national phase entry under 35 U.S.C. §371 of International Application No. PCT/SG2012/000126, filed Apr. 12, 2012, published in English, the disclosure of which is incorporated by reference herein.

FIELD OF INVENTION

The present invention relates to liner plates used in mobile earth-moving machinery.

BACKGROUND

Liner plates are employed in mobile earth-moving machinery, specifically at interface surfaces of load-bearing portions such as, for example, bucket trays, truck trays and the like. The liner plates are typically welded to the interface surfaces of load-bearing portions and function primarily as a wear/sacrificial damage item, so as to protect and maintain the integrity of the material used at the load-bearing portions. Furthermore, the liner plates are replaced when worn out (for example, due to abrasion, repeated impacts, and so forth) if the plates do not fail prior to replacement.

Currently, with mobile earth-moving machinery, even when new, there is typically a gap between the interface surface of the load-bearing portion and the liner plate. This is particularly true for instances when there is any curvature on the interface surface and/or the interface surface is uneven due to prior damage from, for example, impacts, abrasions, and so forth. Damage to the interface surface is particularly significant whenever the liner plate is worn down to the interface surface of the load-bearing portion.

One of the main causes of premature liner plate failure (i.e. before it is worn down to its residual thickness) is due to fatigue cracks developing in the welds due to flexure of the liner plate. The break in the welds causes the liner plate to come off in part or completely. This is undesirable in view of the damage which is caused to the interface surface and also the danger caused by the separation of the liner plate from the interface surface. It is also an additional financial burden if the liner plates fail pre-maturely due to the need for more liner plates and the down-time for the mobile earth-moving machinery resulting from the time required to replace the liner plates.

SUMMARY

In a first aspect, there is provided a method for installing a liner plate mounted on an interface surface of a load-bearing portion of mobile earth-moving machinery. The liner plate includes at least two openings and at least one grout strip, with the at least one grout strip being along a perimeter of the liner plate.

The method includes filling a space defined by the at least one grout strip with grout; and allowing air to exit from the space. Preferably, the air exits through a first of the at least two openings of the liner plate. Preferably, the grout is filled through a second of the at least two openings of the liner plate.

In addition, the method includes welding the liner plate to the interface surface, the welding being seam-welding and covering the at least two openings. The method may further including coating the interface surface with lubricant.

It is preferable that the hardening of the grout enables the liner plate and the load-bearing portion to form a single structure with loads being distributed within the single structure. It is advantageous that the grout fully covers the interface surface.

In a second aspect, there is provided a liner plate for mounting on an interface surface of a load-bearing portion of mobile earth-moving machinery. The plate includes at least two openings, whereby a first opening of the at least two openings is configured for passage of grout and a second opening of the at least two openings is configured for passage of air.

The plate also further includes at least one grout strip along a perimeter of the liner plate. The at least one grout strip is fabricated from mild steel.

Preferably, the at least two openings each include a securing mechanism, whereby each securing mechanism is sized to allow the placement of a cover in each of the at least two openings. It is preferable that the securing mechanism is configured for removable attachment of conduits to the liner plate.

DESCRIPTION OF FIGURES

In order that the present invention may be fully understood and readily put into practical effect, there shall now be described by way of non-limitative example only preferred embodiments of the present invention, the description being with reference to the accompanying illustrative figures.

FIG. 1A shows a top perspective view of an embodiment of a liner plate of the present invention.

FIG. 1B shows a bottom perspective view of an embodiment of a liner plate of the present invention.

FIG. 1C shows an enlarged view of a first edge A of FIG. 1A.

DESCRIPTION OF PREFERRED EMBODIMENTS

Figure 2A:
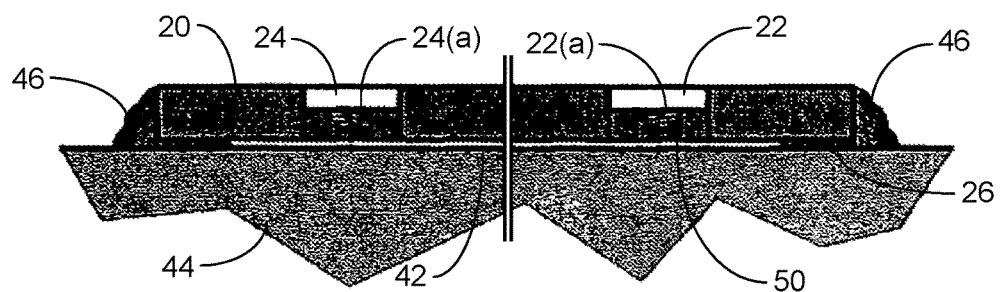
FIGS. 2A-2C show various a cross-sectional views of the carrying out of a method of the present invention.
Figure 2B:
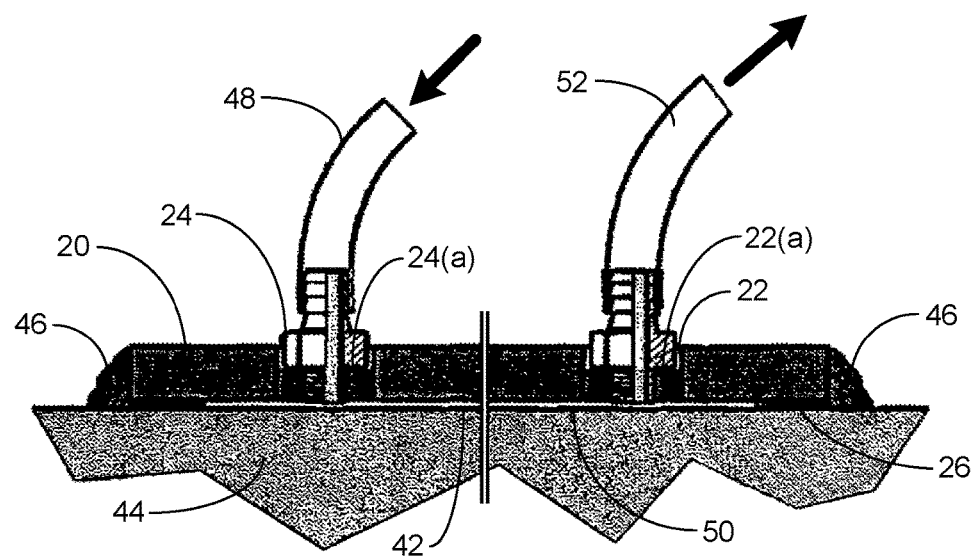
Figure 2C:
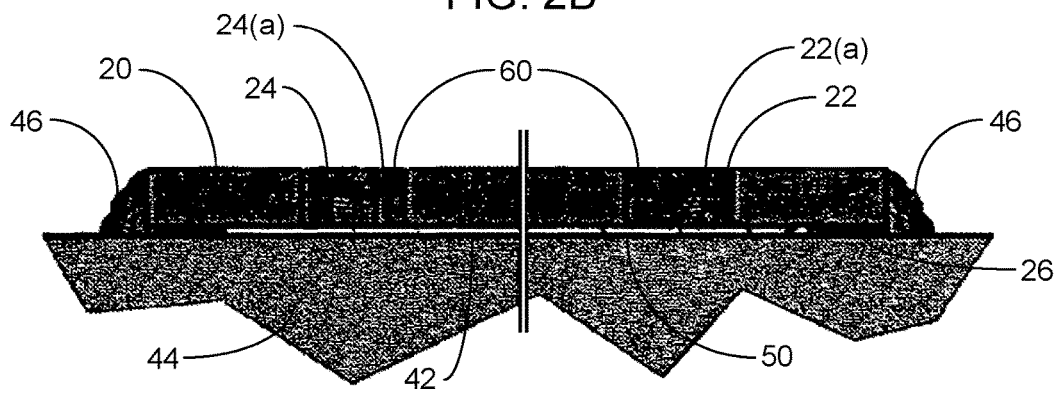
Figure 3:
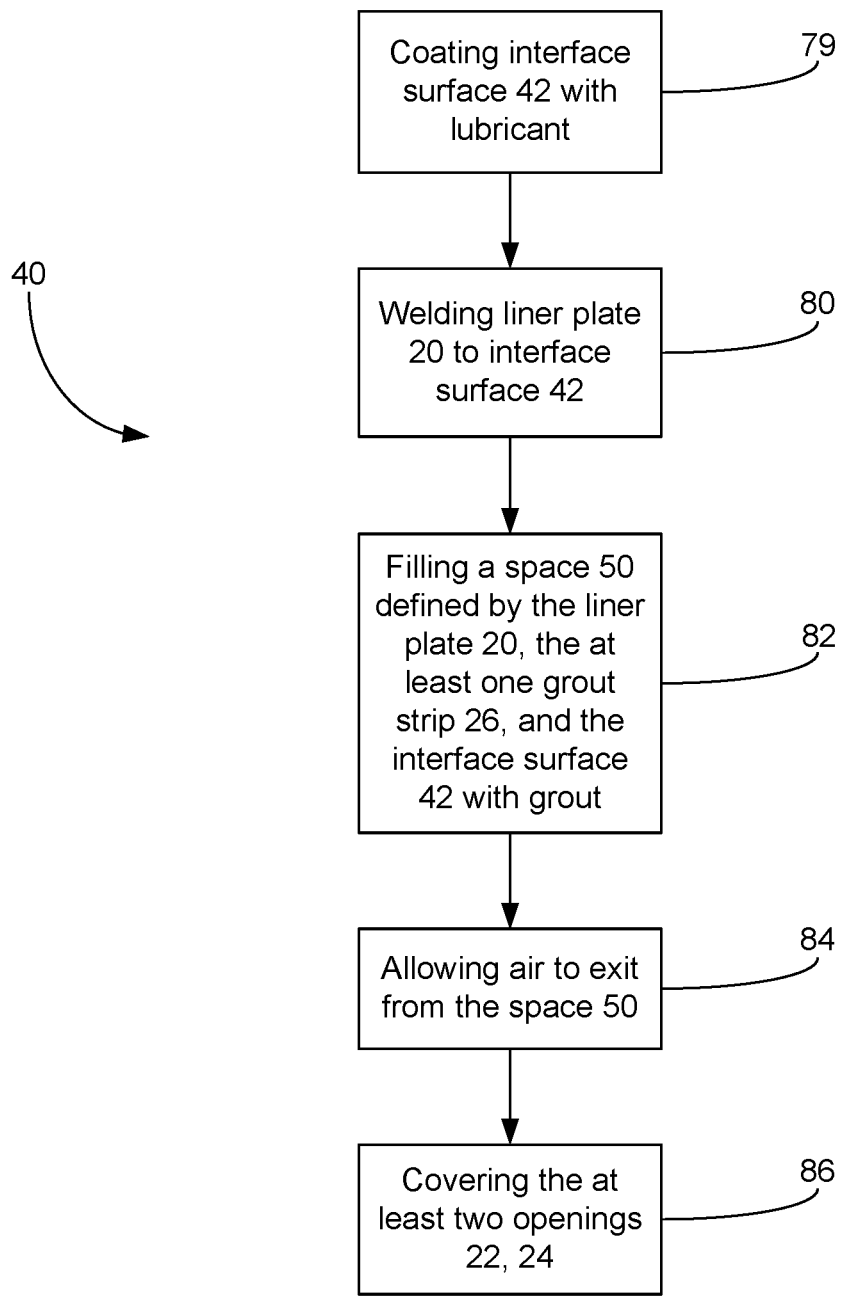
FIG. 3 shows a process flow for the method of FIGS. 2A-2C.

The present invention relates to a method for installing a liner plate and also relates to the liner plate per se. Some advantages of the invention, which will be evident from the disclosure of the subsequent paragraphs, include prolonging the usage duration for a liner plate, minimizing dangers due to pre-mature failure of liner plates, and minimizing cost for users.

Referring to FIGS. 1A-1C, such figures show various views of an embodiment of a liner plate 20. The liner plate 20 is usable for mounting on an interface surface of a load-bearing portion of mobile earth-moving machinery. The load-bearing portion includes, for example, bucket trays, truck trays and the like. In FIG. 1A, a top view of the liner plate 20 is shown with a first edge A being cut off to reveal a detailed view of a first opening 24.

The liner plate 20 includes at least two openings 22, 24. The first opening 24 is configured for passage of grout and a second opening 22 is configured for passage of air. It should be appreciated that the first opening 24 also allows passage of air and the second opening 22 also allows passage of grout. The first opening 24 and the second opening 22 each include a first securing mechanism 24(a) and a second securing mechanism 22(a) respectively. The first securing mechanism 24(a) and the second securing mechanism 22(a) may be identical, and need not be of the "screw-in" form shown in FIGS. 1A-1C. The securing mechanism 24(a), 22(a) is for the removable attachment of conduits to the liner plate. Each securing mechanism 24(a), 22(a) should be sized to allow the placement of a cover in each of the at least two openings 22, 24. Even though the securing mechanism 24(a), 22(a) is shown to be located at or closer to a first face 28 of the liner plate 20, it should be appreciated that the securing mechanism 24(a), 22(a) may also be located at or closer to a second face 30 of the liner plate 20.

The liner plate 20 may also include at least one grout strip 26 on the first face 28, whereby the at least one grout strip 26 is positioned along a perimeter of the liner plate 20. It should be appreciated that along the perimeter means at or close to the perimeter of the liner plate 20. The at least one grout strip 26 may comprise several parts but the several parts should be continuously joined to one another without any substantial gaps at the joints. The at least one grout strip 26 may be fabricated separately and subsequently permanently affixed to the liner plate 20. While the at least one grout strip 26 is shown to be located on the first face 28, it should be appreciated that the at least one grout strip 26 should be located at a face of the liner plate 20 which is mounted on an interface surface of a load-bearing portion of mobile earth-moving machinery. In one embodiment, the at least one grout strip 26 is 3 mm thick and 23 mm wide and fabricated from mild steel. The at least one grout strip 26 should be fabricated from a material which is able to be welded and will not reduce a structural strength of a weld which adheres to the at least one grout strip 26.

The advantages brought about from use of the liner plate 20 will be evident when the liner plate 20 is used in the method 40 of the present invention which will be described in the following paragraphs.

Referring to FIGS. 2A-2C and 3, there is provided the method 40 for installing the liner plate 20 mounted on an interface surface 42 of a load-bearing portion 44 of mobile earth-moving machinery. The load-bearing portion includes, for example, bucket trays, truck trays and the like.

The method 40 includes coating the interface surface 42 with lubricant (79) and subsequently welding the liner plate 20 to the surface 42 (80), the liner plate 20 being seam-welded 46 to the surface 42 (shown in FIG. 2A).

Subsequently, the method 40 includes filling a space 50 defined by the liner plate 20, the at least one grout strip 26, and the interface surface 42 with grout (82) through a first conduit 48. The first conduit 48 should be removably attached to the securing mechanism 24(a) of the first opening 24 of the liner plate 20. Grout is channeled into the space 50 via the first conduit 48 such that the grout fully covers the interface surface 42. The method 40 also includes allowing air to exit from the space 50 (84), whereby the air exits through the second opening 22 of the liner plate 20, specifically through a second conduit 52 removably attached to the securing mechanism 22(a) of the second opening 22. The exit of the air from the space 50 removes voids in the grout (shown in FIG. 2B).

When the grout fully covers the interface surface 42 and voids in the grout are minimized, an incidence of grout failure is minimized as relative movement of the liner plate 20 with the interface surface 42 is minimized. Furthermore, hardening of the grout enables the liner plate 20 and the load-bearing portion 44 to form a single structure with loads being distributed within the single structure.

Finally, the method 40 also includes covering the two openings 24, 22 (86) after removal of the first conduit 48 and the second conduit 52 from the liner plate 20. The two openings 24, 22 can be covered by hard facings 60 welded over the openings 24, 22 (shown in FIG. 2C).

In an embodiment of method 40 where the interface surface 42 is coated with lubricant (79), the grout enables ease of removal of the liner plate 20 from the interface surface 42.

It should be appreciated that since the liner plate 20 and the load bearing portion 44 forms a single structure, it becomes possible to utilize thinner and consequently lighter liner plates 20, which aids in minimizing cost of the liner plates 20. Furthermore, since the method 40 minimizes relative movement of the liner plate 20 with the interface surface 42, cracks in the welds 46 between the liner plate 20 with the interface surface 42 are also minimized, and this correspondingly minimizes pre-mature liner plate 20 failure due to weld cracks. As pre-mature failure of the liner plate 20 is minimized, the usage duration of the liner plate 20 is consequently prolonged.

While there has been described in the foregoing description preferred embodiments of the present invention, it will be understood by those skilled in the technology concerned that many variations or modifications in details of design or construction may be made without departing from the present invention.

The invention claimed is:

1. A method for minimizing relative movement between a liner plate and an interface surface of a load-bearing portion of mobile earth-moving machinery, the liner plate comprising a first opening, a second opening, and a grout strip, the grout strip being disposed along a perimeter of the liner plate, the method comprising:
   a) welding the liner plate at the grout strip to the interface surface;
   b) filling a space defined by the grout strip, the liner plate, and the interface surface with grout, the filling being performed via the first opening while air from the space exits through the second opening; and
   c) allowing the grout to harden,
   wherein a hardening of the grout enables the liner plate and the load-bearing portion to form a single structure to distribute load within the single structure.

2. The method of claim 1, further including:
   covering the first and second openings.

3. The method of claim 1, wherein the grout fully covers the interface surface.

4. The method of claim 1, further including coating the interface surface with lubricant to ease removal of the liner plate from the interface surface.

5. The method of claim 1, wherein the welding comprises seam welding.

6. A liner plate for mounting on an interface surface of a load-bearing portion of mobile earth-moving machinery, the plate comprising:
   a) at least two openings; and
   b) at least one grout strip along a perimeter of the liner plate,
   wherein the liner plate is configured to be welded at the interface surface at the at least one grout strip to create a space defined by the grout strip, the liner plate, and the interface surface,
   wherein a first opening of the at least two openings is configured for passage of grout to fill up the space and a second opening of the at least two openings is configured for passage of air, and wherein the liner plate is configured to function as a replaceable sacrificial damage item to prevent the interface surface from getting damaged while also preventing pre-mature damage of the liner plate itself due to weld-cracks and localized deformation by minimizing relative movement between the liner plate and the interface surface.

7. The plate of claim 6, wherein the at least one grout strip is fabricated from mild steel.

8. The plate of claim 6, wherein the at least two openings each include a securing mechanism.

9. The plate of claim 8, wherein each securing mechanism is sized to allow the placement of a cover in each of the at least two openings.

10. The plate of claim 8, wherein the securing mechanism is configured for removable attachment of conduits to the liner plate.

11. The plate of claim 7, wherein the at least one grout strip is 3 mm thick and 23 mm wide.

12. A method for minimizing relative movement between a liner plate and an interface surface of a load-bearing portion of mobile earth-moving machinery, the liner plate comprising a first opening, a second opening, and a grout strip, the grout strip being disposed along a perimeter of the liner plate, the method comprising:
   a) coating the interface surface with a lubricant;
   b) welding the liner plate at the grout strip to the interface surface;
   c) filling a space defined by the grout strip, the liner plate, and the interface surface with grout, the filling being performed through the first opening while air from the space exits through the second opening; and
   d) allowing the grout to harden,
   wherein a hardening of the grout enables the liner plate and the load-bearing portion to form a single structure that distributes load within the single structure, and
   wherein coating the interface surface with the lubricant eases removal of the liner plate from the interface surface.

13. The method of claim 12, further comprising removably attaching a first conduit to a securing mechanism of the first opening to channel grout to fill the space.

14. The method of claim 12, further comprising removably attaching a second conduit to a securing mechanism of the second opening to allow air to exit from the space through the second conduit and to avoid voids in the grout.

15. The method of claim 13, further comprising removing the first conduit from the securing mechanism after the space is filled and coupling a hard facing over the first opening.

16. The method of claim 14, further comprising removing the second conduit from the securing mechanism after the space is filled and coupling a hard facing over the second opening.

17. The method of claim 12, wherein the grout fully covers the interface surface.

18. The method of claim 12, wherein coupling comprises seam welding.

19. The method of claim 12, wherein the grout strip is 3 mm thick and 23 mm wide.

20. The method of claim 12, wherein the grout strip comprises mild steel.

* * * * *